# 3,057,918
PRODUCTION OF BIURET

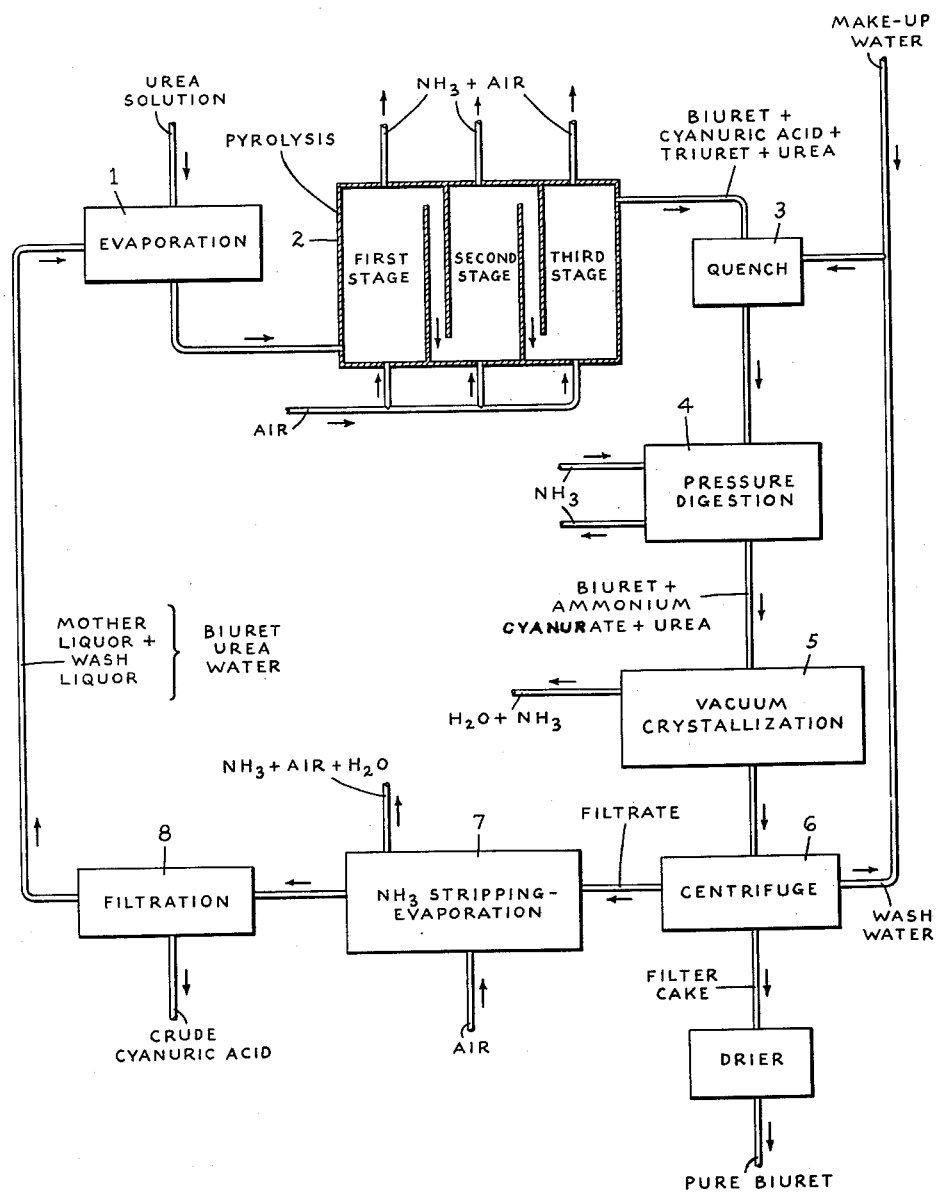

Robert L. Formaini, Petersburg, and Garland C. Ellis, Hopewell, Va., assignors to Allied Chemical Corporation, New York, N.Y., a corporation of New York
Filed Aug. 11, 1959, Ser. No. 833,095
13 Claims. (Cl. 260—553)

This invention is directed to a process for treating a crude biuret produced by pyrolysis of urea and accompanied by genetic impurities, including cyanuric acid and triuret, by digestion with an aqueous solution of ammonia to convert genetic impurities into compounds more readily separable from the biuret by crystallization.

More particularly this invention is directed to a recycle process for the production of biuret by pyrolysis of urea in which the crude biuret pyrolysis product is digested with hot aqueous ammonia solution, a hot aqueous solution of the digested product is cooled to crystallize a substantially pure biuret from this solution, ammonia, both free and combined as ammonium cyanurate, is removed from the biuret mother liquor, by-product cyanuric acid is crystallized from the liquor from which ammonia has been removed and is separated from its mother liquor, the cyanuric acid mother liquor is evaporated to dryness and the mixture of urea, biuret and cyanuric acid thus recovered from the urea pyrolysis product is returned with make-up urea to the urea pyrolysis for further production of biuret and its recovery as a substantially pure product of the process.

It is known that by heating urea to temperatures of about 135° C. up to about 215° C. biuret may be produced as the principal product of the pyrolysis of urea. It is known that by maintaining the material undergoing pyrolysis under low pressures below atmospheric or by passing through it under pressures not substantially above atmospheric pressure a stripping gas such as air, ammonia produced by reaction of the urea to form biuret and other urea pyrolysis products which are simultaneously formed, is removed from contact with the material undergoing pyrolysis. By thus lowering the partial pressure of ammonia in contact with the material undergoing pyrolysis, the time required to attain a desired conversion of the urea to its pyrolysis products is shortened.

For recovering biuret from urea pyrolysis products, it has been the practice to heat the pyrolysis product with water to dissolve the biuret, to separate the solution thus obtained from the undissolved material, and to cool the solution to crystallize the biuret. Biuret cyanurate, urea cyanurate and triuret are the chief impurities that crystallize with the biuret. Repeated re-crystallization from water solution decreases the impurity content of the recovered product. There is a point, however, at which the relative solubility in water of the biuret and impurities present will not permit further purification by this procedure. Furthermore, as it is sought to increase the purity of the biuret product, it becomes increasingly uneconomical to treat the large volumes of mother liquor and wash liquor which are produced, for recovery of their content of biuret, triuret, cyanuric acid and urea.

We have now discovered that by digesting the crude biuret in a hot aqua ammonia, genetic impurities are converted into compounds having high solubilities in an aqua ammonia as compared with the solubility of biuret. A substantially pure biuret crystallizes from its hot concentrated solutions in an aqua ammonia when they are suitably cooled. Most of the mother liquor may be separated from the thus crystallized biuret by filtration or centrifuging and wash water serves to remove the residual mother liquor adhering to the crystals. By stripping ammonia from the mother liquor, either by boiling it or by passing a stripping gas such as air through the hot liquor, cyanuric acid crystallizes out and may be separated from its mother liquor to obtain a crude cyanuric acid.

In general the prior art processes for pyrolyzing urea to produce biuret have involved batch operations in which a body of reaction mixture was heated at suitable temperatures until the desired conversion of urea was obtained. It has been suggested that this process might be operated continuously. We have found, however, that in continuously operating such a process, supplying molten urea to the heated body of reaction mixture and continuously drawing off reaction product, for a given conversion of the urea to its pyrolysis products, lower yields of biuret and higher yields of cyanuric acid and triuret than expected are obtained.

We have also discovered biuret is more efficiently produced from urea by these continuously operating processes, when the reaction mixture is heated in a plurality of separate reaction stages, with the urea continuously introduced into the first of the reaction stages, the molten pyrolyzate is continuously drawn from each stage and, separated from the gaseous products of the pyrolysis, is introduced into the succeeding stage of the series, and the reaction product is withdrawn continuously from the last stage of the series. Our multiple stage pyrolysis of urea to form biuret can be carried out in two or more separate stages. However, the increase in efficiency decreases as the number of stages is increased. As a practical matter, therefore, we prefer to provide no more than 5 separate reaction stages for the pyrolysis of the urea. We have discovered that for a given conversion of urea to its pyrolysis products, the total residence time of the material in the plurality of reaction stages is shorter than when operating with a single reaction stage, thus increasing the rate of biuret production for a given volume of reactor capacity which is provided. Furthermore, by thus operating, the product obtained contains an increased amount of biuret and decreased amounts of triuret and cyanuric acid as compared with carrying out the pyrolysis in a single reaction stage to which urea is continuously supplied and from which the pyrolysis product is continuously withdrawn. Purification of the crude biuret thus obtained by the procedure heretofore described is simplified. Less aqua ammonia is required for digesting the crude biuret and a shorter heating time may be used in the digestion step.

The mother liquor from the crystallization of the cyanuric acid and wash liquor produced by washing the crystallized cyanuric acid with water to remove residual mother liquor, contains biuret not removed in the biuret crystallization and unreacted urea present in the original crude biuret.

We have found that our particular procedure for recovering the purified biuret and a crude cyanuric acid by-product from the crude biuret product of the urea pyrolysis, permits recovering and returning the biuret and urea present in the cyanuric acid mother liquor to the urea pyrolysis step for conversion of the urea to biuret and recovery of the biuret, without undue cost for evaporating the water content of this mother liquor, with or without also evaporating the wash liquor produced in washing residual mother liquor from the cyanuric acid crystals for recycle of its solid content to the urea pyrolysis.

When our novel procedures for pyrolyzing urea or for recovering a purified biuret and cyanuric acid byproduct from a urea pyrolysis product are employed individually in conjunction with conventional procedures for the production of biuret by pyrolyzing urea, each of these novel steps lends their own particular advantages to such a process. Combined in a complete recycle procedure such as is shown by the accompanying drawing and described below, they cooperate to make the recovery of a substantially pure biuret and a cyanuric acid by-product with recycle of unrecovered biuret and unreacted urea economically advantageous. The multiple stage, continuously operating procedure for pyrolyzing the urea particularly contributes to the economical operation of the recycle process to which our invention is directed, by increasing the amount of biuret recovered from the pyrolysis product relative to the amount of crude cyanuric acid which is produced and by reducing the amounts of biuret and unconverted urea to be recycled and of water to be evaporated from the solution containing the recycled material.

With respect to conditions suitably employed in operating the novel steps of processes embodying our invention as described above; for the pyrolysis of the urea, temperature conditions known to the art favoring conversion of urea to biuret may be employed. Thus, the urea can be heated at temperatures within the range of 135° C. to 200° C. The ammonia evolved is withdrawn from contact with the reaction mixture by maintaining it at a low pressure below atmospheric or by maintaining it under a pressure not substantially above atmospheric and passing air or other stripping gas through and in contact with the pyrolysis mixture to strip therefrom the ammonia as it is formed.

When employing our novel procedure for pyrolyzing urea in a plurality of reaction stages, certain conditions are particularly effective. It is preferred, though not necessary, to maintain substantially the same temperatures in each of the plurality of reaction stages through which the molten pyrolysis mixture is passed in sequence. Preferably a total of about 1.0 mol of air is passed through the reaction stages for every 0.2 to 3.5 mols of urea introduced into the first of the series of reaction stages. The volume ratio of air introduced to pyrolysis melt present in each of the several reaction stages may be about the same for each stage or may differ as between the several stages. Particularly when employing more than two stages for the conversion of the urea to biuret, it is preferred to employ a higher volume ratio of air to pyrolysis melt present in each of the first two stages, where greater volumes of ammonia are evolved and are stripped from the pyrolysis melt, than in each of the subsequent stages, in which less ammonia is to be stripped from the material undergoing reaction.

Rapid conversion to biuret, as compared with operating at lower temperatures, and limitation in the amount of cyanuric acid produced, the formation of which is favored by the higher temperatures, are obtained by operating at 145° C. to 190° C., preferably at temperatures of about 165° C. to about 175° C. At these temperatures and with a total residence period in the reaction stages of about 0.3 to about 2 hours, based on the rate of feed to the first stage, a preferred relatively low attack on the urea is obtained. Typical crude biuret pyrolyzates leaving the final pyrolysis stage contain (in percentages by weight) about 28% to about 42% biuret and about 65% to about 40% of unreacted urea; the remainder being principally cyanuric acid and triuret amounting to about 3% to about 14% cyanuric acid and about 5% to about 7% triuret. These conditions are particularly suitable when our multiple stage pyrolysis of urea is employed with our recycle process for recovery of the biuret and cyanuric acid from the pyrolysis product and recycle of the unreacted urea to renewed pyrolysis treatment accompanied by the unrecovered biuret and cyanuric acid. When this multiple stage procedure is employed in conjunction with conventional methods for the recovery of the biuret, longer residence periods in the pyrolysis stages may be employed to obtain higher conversions of the urea. This will result, however, in an increase in the proportion of cyanuric acid and triuret in the pyrolysis product, with a corresponding decrease in efficiency of conversion of the urea to biuret.

The digestion of the urea pyrolysis product is suitably carried out by mixing it with 10% or stronger aqua ammonia and maintaining the mixture at temperatures of about 80° C. to about 110° C. and the ammonia concentration above 10% $NH_3$ throughout the digestion. (Throughout this specification ammonia concentrations of solutions are given as percent by weight of $NH_3$ based on the $NH_3$ and water present in the solution.) The upper limit for the concentraiton of ammonia which can be used is governed only by unnecessary use of a large excess of ammonia and added cost of operating the process. The length of time required for this digestion treatment to substantially free the pyrolysis product of triuret will vary with the temperature within the foregoing range which is maintained. The substantially complete removal of triuret from the digestion product, an aqueous ammonia solution containing biuret, urea and ammonium cyanurate, serves to indicate when the digestion treatment has been adequately completed for subsequent treatment of the digested product for recovery of biuret.

To speed up the conversion of impurities in the pyrolysis mixture it is desirable to digest it at temperatures of at least about 90° C. We prefer to digest the pyrolysis product at about 90° C. to about 100° C., maintaining the ammonia concentration about 10% to about 30% $NH_3$. Under these conditions digestion for about 0.5 to about 2 hours serves to free substantially completely the digested product of triuret. The digestion is carried out under the pressures, generally above atmospheric, required to maintain the desired concentration of ammonia in the solutions undergoing digestion.

A hot, aqueous ammoniacal solution of the digested pyrolysis product is cooled to temperatures at which biuret substantially free from accompanying solid impurities crystallizes from the solution. This solution may be the hot solution produced by the digestion, with or without removal of a portion of the free ammonia present before cooling it. We prefer to employ in the digestion of the pyrolysis product an amount of aqua ammonia which forms a concentrated solution of the digested product at the temperature employed for the digestion, to release any excess pressure over atmospheric under which the digestion was carried out, thus removing a portion of the free ammonia present, and to cool the resulting aqueous ammoniacal solution to about 30° C. to about 40° C. At those temperatures biuret present crystallizes out as a substantially pure solid biuret, and is separtaed from its mother liquor by, for example, filtration or centrifuging and washing with water to remove mother liquor adhering to the crystals. The product thus obtained may be dried in a conventional rotary drier countercurrent to air preheated to about 145° C. While the foregoing represents the preferred procedure for recovering the desired purified biuret from the digested solution, the recovery of a purified biuret can be accomplished by other procedures in which an ammoniacal solution of the products of the digestion in water is prepared, preferably one in which the aqua ammonia concentration is above about 8%, and the biuret is crystallized from that solution.

In treating the mother liquor from which crystallized biuret has been removed for recovery of a crude cyanuric acid by-product, both its free ammonia content and ammonia combined as ammonium cyanurate are removed. This can be accomplished by heating the mother liquor at about 80° C. to about 125° C. and removing the free ammonia from the heated solution, both that originally present as free ammonia and that liberated from ammonium cyanurate at these elevated temperatures. This removal of free ammonia from the solution can be accomplished by passing through it a stripping gas such as air or steam. By boiling the solution at temperatures within the foregoing range, the steam evolved from the solution itself may be utilized as the stripping gas. In thus operating, the water for providing the steam required for stripping the ammonia may be supplied in the mother liquor and by such supplemental water added thereto as may be required to retain in the stripped liquor the urea and biuret present, when the cyanuric acid, which crystallizes out as the ammonia is removed from the solution and when the solution from which ammonia has been stripped is cooled, is separated from its mother liquor. We prefer to heat the biuret mother liquor at temperatures of about 95° to 115° C. under about atmospheric pressure and to pass air through the heated solution to strip out the ammonia. The crystallized cyanuric acid is separated from its mother liquor at temperatures above the recrystallization temperature of the biuret and urea contained therein, preferably at about 65° C. to about 90° C., and the crystals are washed with water to remove adhering mother liquor.

The following examples are illustrative of preferred processes employing our pressure digestion and crystallization of biuret from a urea pyrolysis product, and of processes employing our complete recycle procedure for the treatment of a pyrolysis product produced by our multi-stage pyrolysis of urea which includes the pressure digestion step, recovery of biuret from the digestion product, removal of cyanuric acid by-product from the biuret mother liquor and recycle of the unrecovered biuret and unconverted urea to the pyrolysis. In the examples amounts of materials given in parts or in percentages are by weight unless otherwise specified.

*Example 1.*—Crystal urea was melted and fed to the bottom of a reaction vessel in which a body of molten urea pyrolyzate was maintained at about 165° C. Air was passed through the reactor at the rate of 1.5 mols of air per mol of urea supplied to the reactor. Molten pyrolysis product was continuously withdrawn from the top of the reactor separately from the air and gaseous reaction products leaving the reactor. The average residence time of molten material in the reactor was 100 minutes. Percent conversion of input urea to biuret was about 37%. The molten pyrolysis product had the following composition:

| | Parts |
|---|---|
| Biuret | 28.4 |
| Urea | 43.4 |
| Cyanuric acid | 5.2 |
| Triuret | 4.05 |

A mixture of 81.5 parts of this pyrolyzate, 122 parts water and 28.6 parts ammonia (corresponding to a 19% aqua ammonia) was heated in a closed, pressure resistant vessel at 90°–100° C. for 30 minutes and then cooled in this vessel to 50° C. The pressure in the vessel was reduced to atmospheric pressure. A part of the ammonia present escaped, leaving an ammoniacal aqueous solution of digested product which was passed to a crystallizer in which the solution was cooled. The first crystals appeared at 46° C. and about 56% of the biuret content of the digested product crystallized from the solution at 30° C. The resulting slurry was filtered and the filter cake washed with 46 parts of water and dried. The dried material, amounting to 14.5 parts, contained 98% biuret and 0.5% urea, 0.3% cyanuric acid and 1.2% triuret as impurities.

Biuret decomposes rapidly near its melting point and as much as 5% to 10% triuret present in biuret is not readily apparent from a nitrogen analysis of biuret. Neither melting point nor nitrogen analysis accurately determine the purity of biuret recovered from a urea pyrolysis product. Accordingly, the analytical results given for biuret purity in this application were determined by the following standard analytical methods. For urea by urease digestion. For cyanuric acid by titration. For triuret, by infra-red spectrophotometry. For biuret, by colorimetry.

The results obtained by the process of this Example 1, may be contrasted with a conventional procedure for recovering biuret from a urea pyrolysis product containing 37.5% biuret, 47.6% urea, 8.4% cyanuric acid, 5.9% triuret and 0.6% ammonia. This solid crude biuret was added to water in the ratio of 0.5 part water to 1.0 part of crude biuret and heated to 90° C. with agitation. The mixture was filtered at 90° C. to remove insoluble cyanurates and triuret. The filtrate was cooled and the crystallized biuret was filtered off at 30° C., washed with an equal part of water and dried. The product contained 83.0% biuret, 5.2% urea, 4.4% cyanuric acid and 7.4% triuret. An 83% recovery of the biuret in the crude material was obtained. Repeating this procedure, but increasing the ratio of water to crude biuret to 1.2, resulted in a product containing 85% biuret, but the biuret recovery decreased to 70%. Repeated recrystallization of this 85% biuret from solution in water finally gave a product containing 96% biuret, but only about 50% of the initial biuret was recovered as a product having this purity. Furthermore, this purification led to large volumes of dilute aqueous solutions of biuret which would require costly evaporation to recover the biuret.

The accompanying drawing is a flow sheet illustrating the recycle procedure of our invention for production of a biuret product by pyrolyzing urea, its treatment to recover a purified biuret and a cyanuric acid by-product, and recycle to the urea pyrolysis of unrecovered biuret and unconverted urea together with fresh make-up urea. The following example represents a specific process employing the recycle procedure of our invention illustrated in the drawing.

*Example 2.*—With reference to that drawing, an aqueous 70% urea solution containing 38.9 parts of urea together with recycle mother liquor and wash liquor from the cyanuric acid crystallization, hereinafter described, containing 45.3 parts urea, 14.0 parts biuret and 4.3 parts cyanuric acid, are evaporated in step 1 of the drawing to remove the water. A substantially anhydrous molten urea withdrawn from this evaporation step has the following composition:

| | Percent |
|---|---|
| Urea | 82.2 |
| Biuret | 13.6 |
| Cyanuric Acid | 4.2 |

This urea melt is passed into the bottom of the first of three reaction vessels in which the urea is pyrolyzed in step 2 in three separate reaction stages. The reaction mixture is advanced in series through these vessels, passing from the top of one vessel to the bottom of the next vessel of the series, and is successively maintained in each of the respective reaction stages for a residence period of 17 minutes under substantially atmospheric pressure and at substantially 165° C. by means of steam coils in the reactors. Air is sparged into the bottom of each vessel at the rate of 0.1 mol of air for every 1 mol of urea in the melt introduced into the first reactor, a total of 1 mol of air for every 3.3 mol of urea in the melt introduced into the first of reactor. The air accompanied by ammonia stripped from the pyrolysis mixture passes out of the top of each reactor separated from the pyrolysis melt. A molten, crude biuret product of the following composition is drawn from the top of the last reactor of the series:

| | Percent |
|---|---|
| Biuret | 41.0 |
| Urea | 48.0 |
| Cyanuric Acid | 5.0 |
| Triuret | 5.4 |
| Ammonia | 0.6 |

This crude biuret pyrolysis product is quenched in 3 by mixing with wash liquor from a later step 6 of the process, and with make-up water. About 1.6 parts water for every 1 part of the hot pyrolysis product is introduced into this quenching step. The resulting mixture is passed to pressure digestion 4 together with 50 parts of ammonia for every 100 parts of the crude biuret product. This digestion is carried out in a pressure resistant vessel provided with a coil through which steam or cooling water may be passed to heat or cool the material in the vessel. The quenched material is digested in the aqueous ammoniacal solution formed by the ammonia and water present by heating the mixture for 45 minutes at 90°–100° C. Under these conditions the concentration of aqua ammonia present throughout the digestion is maintained at 23.5% to 24.0% $NH_3$ and 76.5% to 76% $H_2O$, a portion of the ammonia introduced reacting with the cyanuric acid to form ammonium cyanurate.

The solution of digested pyrolysis product is cooled to 50° C. and the pressure reduced by venting the gas present, which is chiefly ammonia. The solution is passed to step 5, where it is cooled to about 30° C., a temperature below the crystallization temperature of biuret from the solution. This cooling is accomplished by subjecting the solution to a reduced pressure below atmospheric of about 36 mm. Hg, under which water and ammonia are vaporized and the solution is cooled to the desired crystallization temperature. The resulting slurry is centrifuged in step 6 and the filter cake is washed with 25 parts water and dried. The wash liquor is introduced into step 3 together with make-up water for quenching the urea pyrolysis product. In each cycle of the process of this example, about 85% of the biuret produced by the pyrolysis of the urea is recovered as a substantially pure biuret.

The filtrate of mother liquor separated from the crystallized biuret is stripped of its ammonia by heating it in step 7 to about 100° C. and passing air through it. As the ammonia is removed, ammonium cyanurate is converted to cyanuric acid which crystallizes from solution. The resulting slurry of cyanuric acid at 65° C. is filtered from its mother liquor in step 8, and the filter cake is washed with 11 parts hot water. The crude cyanuric acid thus obtained is taken off as a by-product of the process, containing about 25 parts cyanuric acid for every 100 parts biuret which is recovered in step 6. This crude cyanuric acid may be utilized as a fertilizer or it may be purified by re-crystallization before being marketed. Both the cyanuric acid mother liquor and wash liquor are passed to evaporation step 1 where the water is evaporated together with the water in the concentrated urea solution supplied to the process.

Example 2 employs specific preferred conditions for operation of a complete recycle process of our invention. This recycle process shown in the drawing may be operated employing conditions in the several steps within the limitations heretofore set out for the pyrolysis of urea to form biuret, digestion of the pyrolysis product with equeous ammonia, crystallization of biuret from an aqueous solution of the digested product, removal of ammonia and crystallization of cyanuric acid from the biuret mother liquor. While the particular example pyrolyzes the urea in a series of three separate reaction stages, this number can be decreased to two or increased to four or more, still retaining the benefits of our multiple stage, continuously operating procedure as compared with employing a single reaction stage.

*Examples 3, 4 and 5.*—These examples permit comparing the results obtained employing 1, 2 and 3 stages for the conversion of urea to biuret, operating with equilibrium conditons attained in each process. In each case urea was melted and continuously supplied to one or to the first of a plurality of reactors of substantially the same size, operated in series as respects flow of the pyrolysis product through each reactor of the series. Air was continuously passed through the molten material in each reactor to strip out ammonia. In example 4 the air was equally divided between each of the two reactors. In Example 5, of a total air flow of 1.61 mols per mol urea fed to the first reactor, 0.63 mol, 0.61 mol and 0.37 mol were fed to the first, second and third reactors, respectively. Other conditions maintained were as follows:

| Example | 3 | 4 | 5 |
|---|---|---|---|
| Number of reactors | 1 | 2 | 3 |
| Temperature, °C | 165 | 163–165 | 164–166 |
| Mols urea to first reactor per mol total air suppleid | 0.37 | 0.50 | 0.62 |
| Rate of urea feed (¹) | 0.8 | 2.4 | 4.2 |
| Rate of crude biuret withdrawal (¹) | 0.7 | 2.1 | 3.6 |
| Total residence time, minutes | 109 | 71 | 63 |
| Percent conversion of input urea to biuret | 37 | 41 | 41 |
| Composition of Crude Biuret (Wt. percent): | | | |
| Biuret | 36.3 | 39.9 | 40.4 |
| Urea | 45.3 | 46.1 | 47.5 |
| Cyanuric Acid | 10.1 | 6.1 | 5.3 |
| Triuret | 7.7 | 7.3 | 6.2 |
| $NH_3$ | 0.6 | 0.6 | 0.6 |

¹ Rates of urea feed and crude biuret withdrawal are in pounds/minute.

We claim:
1. The process for treating a crude biuret product of the pyrolysis of urea accompanied by genetic impurities including cyanuric acid and triuret, which comprises digesting at about 80° C. to about 110° C. said crude biuret in an aqua ammonia maintained at a minimum concentration of about 10% $NH_3$ until the digestion product is substantially free from triuret.

2. The process of claim 1 in which the concentration of the aqua ammonia is maintained at above 10% to about 30% $NH_3$.

3. The process of claim 1 in which a solution of the digested urea pyrolysis product in aqua ammonia is cooled to a temperature at which biuret substantially free from accompanying solid impurities crystallizes from the solution, and separating the thus crystallized biuret from its mother liquor.

4. The process of claim 1 wherein the crude biuret is produced by heating urea at temperatures in the range about 135° C. to about 200° C. under pressures not substantially above atmospheric in a series of at least 2 separate reaction stages into the first of which the urea is continuously introduced, the molten pyrolyzate is continuously drawn from each stage, and separated from the gaseous products of the pyrolysis, is introduced into the succeeding stage of the series, and the crude biuret reaction product is withdrawn continuously from the last stage of the series.

5. The process of claim 3 in which the biuret is crystallized from a solution of the digested urea pyrolysis product in an aqua ammonia of a concentration of above about 8% $NH_3$ whereby cyanuric acid is retained in the solution in solubilized form.

6. The process of claim 3 in which cyanuric acid during biuret separation is retained in soluble form and both free ammonia and ammonia combined as ammonium cyanurate are removed from the mother liquor separated from the crystallized biuret and cyanuric acid is crystallized from the solution thus freed of ammonia.

7. The process of claim 5 in which the crude biuret is digested in an aqua ammonia maintained at a concentration above 10% to about 30% $NH_3$.

8. The process of claim 6 in which the crude biuret is digested in an aqua ammonia maintained at a concentration above 10% to about 30% $NH_3$, and a stripping gas is passed in contact with the mother liquor separated from the crystallized biuret at about 80° C. to about 125° C. to remove ammonia therefrom.

9. The process of claim 8 in which the urea is pyrolyzed at 145° C. to 190° C. in each of 3 to 5 separate stages in a series of vessels in which the reaction mixture is passed from the top of each vessel to the bottom of each succeeding vessel for a total residence period in said stages of about 0.3 to about 2 hours to form a pyrolysis product leaving the last stage of the series containing, in percentages by weight, about 28% biuret and about 65% unreacted urea to about 42% biuret and about 40% unreacted urea, the remainder, principally cyanuric acid and triuret, amounting to about 3% to about 14% cyanuric acid and about 5% to 7% triuret.

10. The process for pyrolyzing urea to form biuret which comprises heating urea at temperatures in the range about 135° C. to about 200° C. under pressures not substantially above atmospheric in a series of at least 2 separate reaction stages into the first to which the urea is continuously introduced, the molten pyrolyzate is continuously drawn from each stage and, separated from the gaseous products of the pyrolysis is introduced into the succeeding stage of the series, and the crude biuret reaction product is withdrawn continuously from the last stage of the series.

11. The process of claim 10 in which the urea is pyrolyzed at 145° C. to 190° C. in each of 3 to 5 separate stages for a total residence period in said stages of about 0.3 to about 2 hours to form a pyrolysis product leaving the last stage of the series containing, in percentages by weight, about 28% biuret and about 65% unreacted urea to about 42% biuret and about 40% unreacted urea, the remainder, principally cyanuric acid and triuret, amounting to about 3% to about 14% cyanuric acid and about 5% to 7% triuret.

12. The process for treating a crude product of the pyrolysis of urea containing genetic impurities including cyanuric acid which comprises digesting said crude product in hot aqueous ammonia solution maintained at a concentration of at least about 10% $NH_3$, thereafter cooling the aqueous ammonia solution so as to fractionally crystallize unsolubilized pyrolysis product while retaining solubilized cyanuric acid in solution, and separating the crystallized fraction from the aqueous ammonia solution.

13. A cyclic process for production of biuret which comprises heating urea at temperatures in the range about 135° C. to about 200° C. under pressures not substantially above atmospheric, thereby producing a pyrolyzate containing biuret and genetic impurities including cyanuric acid and triuret, quenching the crude pyrolysis product and digesting it in hot aqueous ammonia solution maintained at a concentration of at least about 10% ammonia until the digestion product is substantially free from triuret, thereafter cooling the ammonia solution to fractionally crystallize biuret while retaining solubilized cyanuric acid in solution, separating the crystallized fraction from aqueous ammonia solution, stripping ammonia from the resulting aqueous ammonia solution whereby cyanuric acid is rendered insoluble, separating the resulting cyanuric acid solid from aqueous solution, concentrating the aqueous solution by evaporation of water therefrom and mixing the resulting concentrate with urea for subsequent pyrolysis in the pyrolysis step of the process.

References Cited in the file of this patent

UNITED STATES PATENTS

| | | |
|---|---|---|
| 2,370,065 | Olin | Feb. 20, 1945 |
| 2,524,049 | Garbo | Oct. 3, 1950 |
| 2,916,516 | Michelitsch | Dec. 8, 1959 |

OTHER REFERENCES

Redemann et al.: Ind. and Eng. Chem., vol. 50, No. 4, pp. 633–636 (1958).